United States Patent [19]

Parno

[11] Patent Number: 4,635,991
[45] Date of Patent: Jan. 13, 1987

[54] CORVETTE WING

[76] Inventor: Leroy O. Parno, 5747 E. Admiral Pl., Bldg. C, Tulsa, Okla. 74115

[21] Appl. No.: 747,455

[22] Filed: Jun. 21, 1985

[51] Int. Cl.⁴ .............................................. B62D 35/00
[52] U.S. Cl. ..................................... 296/1 S; 296/1 C
[58] Field of Search ......................... 296/1 S, 91, 1 C; D12/181

[56] References Cited

U.S. PATENT DOCUMENTS 3,791,468  2/1974  Bryan, Jr. ............................. 296/1 S
4,417,760  11/1983 Koch ..................................... 296/1 S
4,533,168  8/1985  Janssen et al. ......................... 296/1 S Primary Examiner—Robert R. Song
Attorney, Agent, or Firm—Head, Johnson & Stevenson

[57] ABSTRACT

A rear deck spoiler wing for attaching to a '84+ model Corvette involving an air foil supported on a pair of closely spaced, essentially vertical, centrally located struts and base plate that bolts to the original bolt pattern of the Corvette gas cap lid. Such a spoiler can be readily attached to and subsequently removed from a Corvette without altering the Corvette or interfering with the original top loading of the fuel, yet the wing can reside directly above the rear deck and fuel inlet.

4 Claims, 4 Drawing Figures

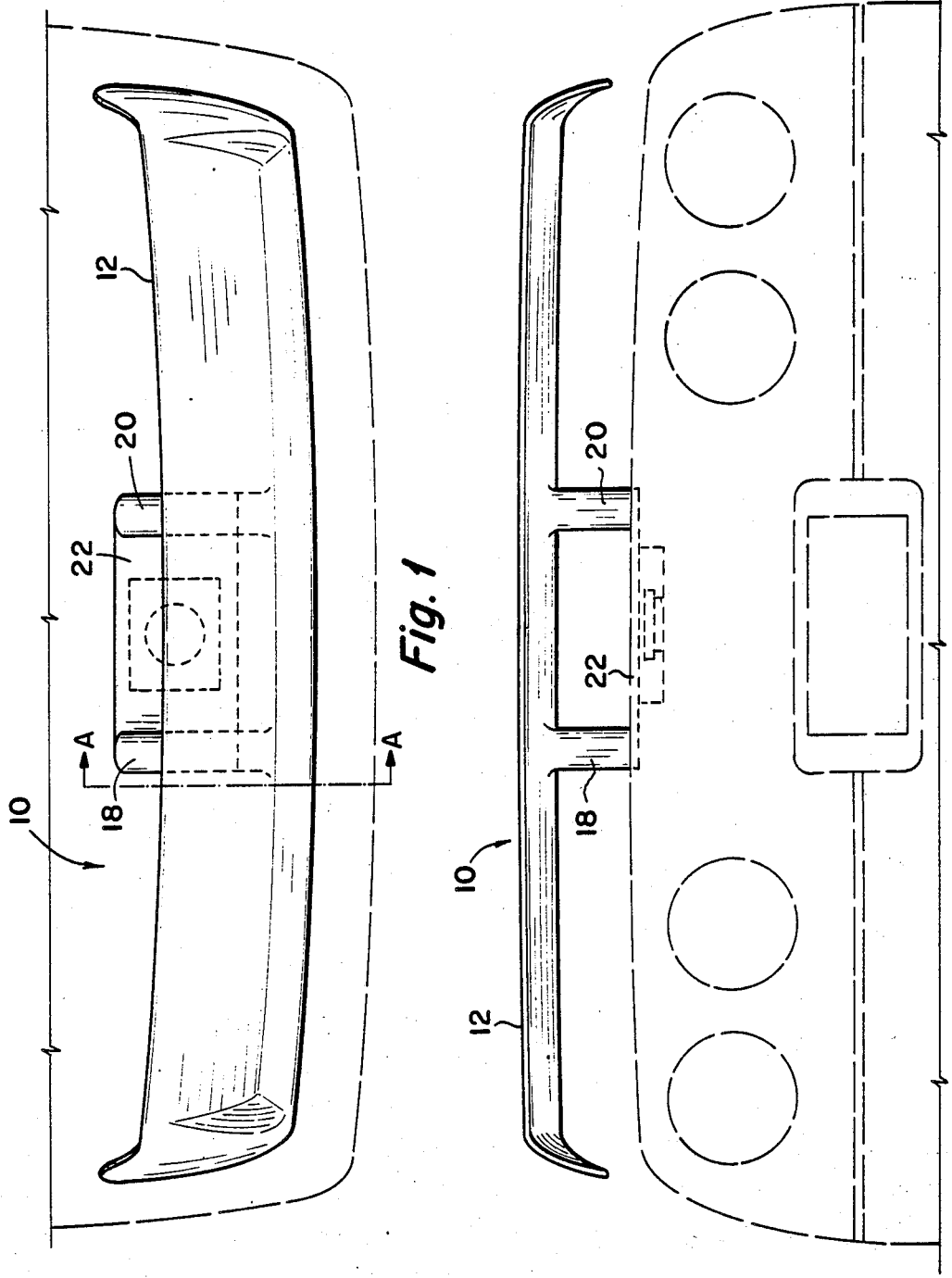

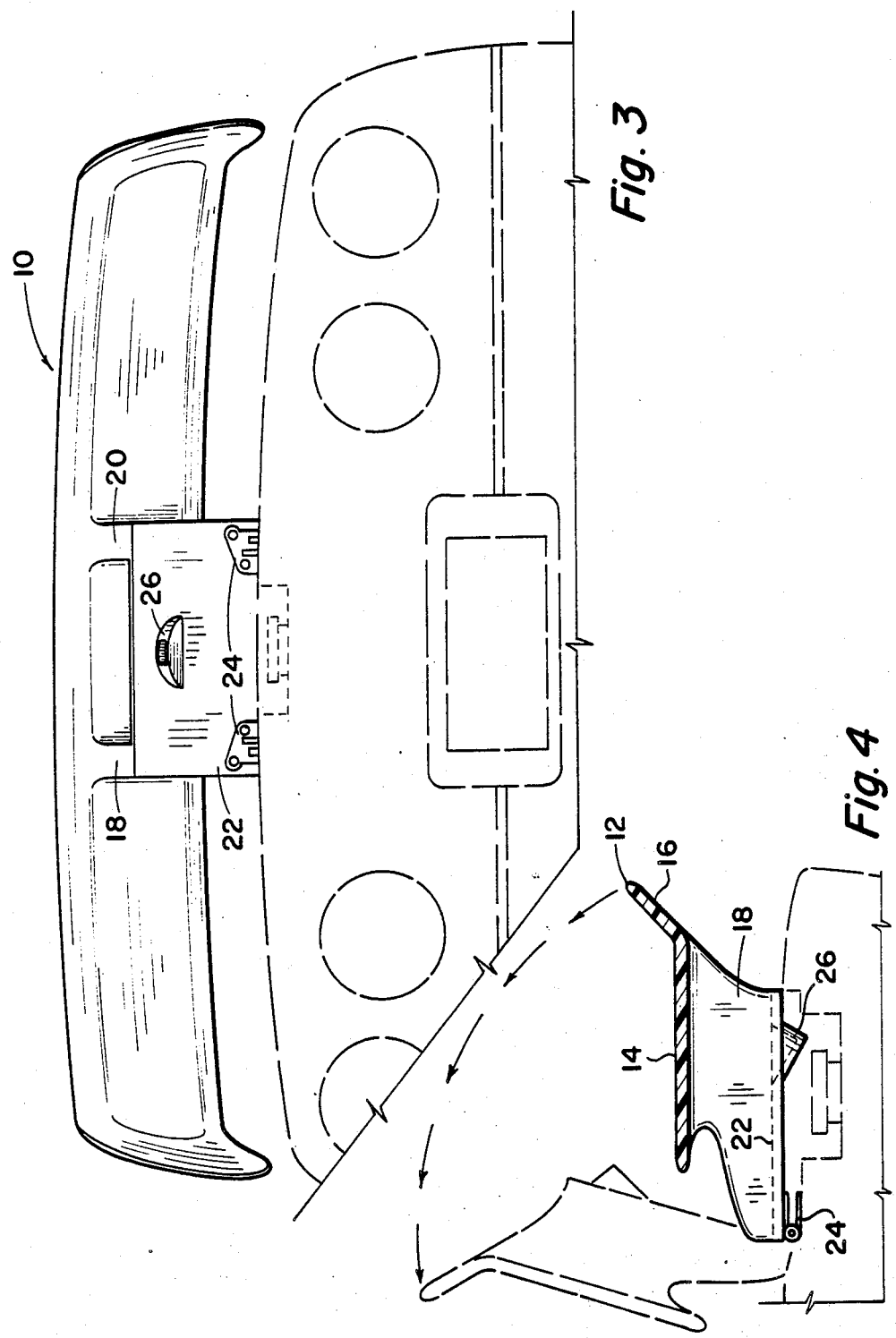

CORVETTE WING

BACKGROUND OF THE INVENTION

1. Field of the Invention

This invention relates to an after market automotive wing or spoiler. More specifically, the invention relates to a rear wing spoiler that interchangeably mounts to the hinges of a Corvette gas cap cover.

2. Description of the Prior Art

The concept of attaching an after market decorative as well as functional rear wing or so-called spoiler to the upper rear portion of the trunk lid or rear deck of an automobile is generally known. Various air deflector surfaces have been designed to mount to the front or the rear deck of an automobile, particularly for reducing lift and increasing the downward force, thus reducing the tendency to lift off the road at high speeds. One particular problem with retrofitting certain cars with a rear spoiler and in particular mounting such a wing to a 1984 version of the Corvette is that the gas cap with cover is located in the center of the rear deck lid. As such, clearance must be maintained to allow for opening of the gas cap and the filling of the fuel tank. Consequently, after market rear wings for the 1984 and newer Corvettes will be displaced rearward beyond the gas cap lid extending behind the car and will require a support member that straddles the gas cap filler area. The support member must then be permanently mounted to the body of the Corvette, thus requiring physical alteration of the body usually in the form of drilling and bolting the wing to the rear deck lid. In principle, such alterations can reduce and diminish the value of the automobile and require significant expense to repair or restore it if the wing is ever removed.

SUMMARY OF THE INVENTION

In view of the problems associated with previous after market rear wing spoilers for retrofitting to automobiles having the fuel cap located in the center of the rear deck such as the 1984 or newer Corvette, I have discovered a rear deck spoiler wing for attaching to the gas cap lid hinge centrally located at the rearward portion of the rear deck of a vehicle, comprising:

(a) an essentially horizontal air foil surface means adapted to remain suspended substantially above the rear deck and gas cap during use and swing upwardly and forwardly during refueling;

(b) a vertical support means operatively attached to essentially the central portion of the underside of the horizontal air foil surface means and adapted to hold the air foil surface means at a fixed distance above the rear deck during use and swing the air foil surface means upwardly and forwardly during refueling; and (c) a horizontal support lid means attached to the lower end of the vertical support means and operatively attachable to and removable from the original gas cap lid hinges.

It is an object of the present invention to provide a rear wing spoiler for the 1984 Corvette that mounts directly to the hinges on the gas cap filler lid. It is an additional object to provide such a rear wing spoiler that will pivot on the gas cap lid hinges such as to allow access to the gas cap for filling the fuel tank. It is an associated object of the present invention to provide a rear wing spoiler that can be readily and quickly mounted to the 1984 Corvette or removed therefrom without permanently altering the exterior of the automobile. Fulfillment of these objects and the presence and fulfillment of additional objects will be apparent upon complete reading of the specification and claims in view of the attached drawings.

BRIEF DESCRIPTION OF THE DRAWINGS

FIG. 1 is a top plan view of the rear wing spoiler according to the present invention when mounted to the gas cap filler lid hinges of a 1984 Corvette.

FIG. 2 is a rear elevational view of the wing spoiler illustrated in FIG. 1.

FIG. 3 is a rear elevational view of the wing spoiler illustrated in FIG. 1 with the wing pivoted upwards for access to the fuel tank.

FIG. 4 is a cross-sectional side view of the rear wing spoiler illustrated in FIG. 1 as seen through line A—A and a corresponding silhouetted view when the wing is tilted upwards and forward for access to the fuel tank.

DESCRIPTION OF THE PREFERRED EMBODIMENTS

The improved automotive rear deck wing spoiler according to the present invention, how it functions and how it differs from previously known rear wing spoilers can perhaps be best explained and understood by reference to the drawings. FIGS. 1 and 2 illustrate the improved rear wing spoiler according to the present invention, generally designated by the numeral 10, as it appears when attached to a 1984 Corvette (in silhouette).

As illustrated, the spoiler is made up of an air foil or wing 12 that extends essentially across the entire width of the Corvette. The air foil 12 is suspended evenly above the rear deck and in this particular embodiment terminates at each side edge with a slight flare or turn downward. It should be appreciated that the specific contours and design of the air foil can be altered to suit the particular end use and desired performance or appearance characteristics as generally known in the art and as such, should be considered equivalent for purposes of this invention. Thus, the air foil can be generally any shape and design, including adjustable leading and trailing edges or the like. Preferably, the air foil 12 is as illustrated in FIG. 4 wherein an essentially horizontal flat surface 14 terminates at the rearward edge in a slight upwardly sloped surface 16.

As seen in FIGS. 2 and 4, the air foil 12 is supported by a pair of substantially vertical, parallel support members 18 and 20 attached symmetrically about the center of the air foil and positioned apart from each other such that they rest substantially on each outer edge of the gas cap filler lid area. Each of the support members 18 and 20 is further attached to a lower horizontal support lid 22 that occupies the position of the original gas cap filler lid. This support lid 22 is designed to attach to the original gas cap lid hinges 24 and allow the entire wing 10 to swing up and forward (see FIGS. 2 and 4). In this forward elevated configuration, the gas cap is totally exposed in a manner analogous to the operation of the original gas cap filler lid, thus allowing the vehicle operator to add fuel to the tank. Optionally, the support lid 22 is equipped with a recessed finger grip for lifting the entire wing.

One of the major advantages of the spoiler wing according to the present invention is the ability to install the wing and subsequently remove it without affecting the originality of the automobile. This is accomplished by virtue of totally eliminating any need to alter the car except for unbolting the original gas cap lid. In other words, the spoiler wing according to the present invention is installed by removing the original gas cap lid at the hinges and then fastening the support plate 22 onto the original hinges. This in turn allows the car to be converted back to its original state by merely reversing the process. As previously illustrated and because the entire wing is supported on the support plate 22, the entire spoiler will swing upwards and forward, thus allowing access to the gas cap area for addition of fuel. Because of the swinging motion and the resulting access to the gas cap, the wing can be positioned over the top of the rear deck as opposed to the prior art devices that extend behind the rear deck at least in the area of the gas cap lid. In this manner, the advantages of optimizing the position of the downward thrust of the wing along with improving the aesthetics are achieved without compromising the original convenience associated with having a top mounted fuel inlet system. And again, all of this is achieved without altering the automobile structurally.

The actual spoiler wing according to the present invention can be manufactured out of any appropriate light weight structural plastic or metal as generally known in the art. Preferably, the wing is fabricated out of a structural plastic such as fiber reinforced plastic similar to the Corvette body or the like. The wing can be finished to match the automobile or done in a contrasting color as generally known in the art.

Having thus described the invention with a certain degree of particularity, it is manifest that many changes can be made in the details of the construction and the arrangement of components without departing from the spirit and scope of this disclosure. Therefore, it is to be understood that the invention is not limited to the embodiments set forth herein for purposes of exemplification, but is to be limited only by the scope of the attached claims including a full range of equivalents to which each element thereof is entitled.

I claim:

1. A rear deck spoiler wing for attaching to the gas cap lid hinge centrally located at the rearward portion of the rear deck of a vehicle, comprising:
    (a) an essentially horizontal air foil surface means adapted to remain suspended substantially above the rear deck and gas cap during use and swing upwardly and forwardly during refueling;
    (b) a vertical support means operatively attached to essentially the central portion of the underside of said horizontal air foil surface means and adapted to hold said air foil surface means at a fixed distance above the rear deck during use and swing said air foil surface means upwardly and forwardly during refueling; and
    (c) a horizontal support lid means attached to the lower end of said vertical support means and operatively attachable to and removable from the original gas cap lid hinges.

2. A rear deck spoiler wing of claim 1 wherein said vertical support means is a pair of closely spaced vertical struts resting and supported on the outer edges of said horizontal support means.

3. A rear deck spoiler wing of claim 2 wherein said horizontal support lid means is further equipped with a recessed handle.

4. A rear deck spoiler wing comprising:
    (a) a substantially horizontal air foil;
    (b) a pair of closely spaced, vertical support struts attached centrally on the underside of said air foil; and
    (c) a substantially horizontal support plate having each of said support struts attached to the outer edge of said support plate and wherein said support plate is adapted to mount to the original hinges of a top loading gas cap lid, thus allowing the spoiler wing to swing open on said hinges when refueling.

* * * * *